(12) United States Patent
Haigh et al.

(10) Patent No.: US 7,295,965 B2
(45) Date of Patent: Nov. 13, 2007

(54) METHOD AND APPARATUS FOR DETERMINING A MEASURE OF SIMILARITY BETWEEN NATURAL LANGUAGE SENTENCES

(75) Inventors: Karen Z. Haigh, Greenfield, MN (US); Kevin M. Kramer, Coon Rapids, MN (US)

(73) Assignee: Honeywell International Inc., Morristown, NJ (US)

( * ) Notice: Subject to any disclaimer, the term of this patent is extended or adjusted under 35 U.S.C. 154(b) by 976 days.

(21) Appl. No.: 09/896,846

(22) Filed: Jun. 29, 2001

(65) Prior Publication Data

US 2003/0004716 A1    Jan. 2, 2003

(51) Int. Cl.
*G06F 17/27* (2006.01)
*G06F 17/30* (2006.01)

(52) U.S. Cl. .............................. 704/9; 707/5
(58) Field of Classification Search ............ 704/227, 704/8, 9, 7, 238; 707/2, 3, 5, 6
See application file for complete search history.

(56) References Cited

U.S. PATENT DOCUMENTS

| 4,916,614 A | 4/1990 | Kaji et al. .................. 364/419 |
| 5,056,021 A | 10/1991 | Ausborn ..................... 364/419 |
| 5,251,131 A | 10/1993 | Masand et al. ........ 364/419.08 |
| 5,418,948 A | 5/1995 | Turtle .......................... 395/600 |
| 5,555,408 A | 9/1996 | Fujisawa et al. ............. 395/600 |
| 5,559,693 A | 9/1996 | Anick et al. ........... 364/419.08 |
| 5,682,539 A | 10/1997 | Conrad et al. .............. 395/759 |
| 5,893,092 A | 4/1999 | Driscoll ......................... 707/5 |
| 5,963,940 A | 10/1999 | Liddy et al. ................... 707/5 |
| 5,987,404 A | 11/1999 | Della Pietra et al. .......... 704/9 |
| 6,076,058 A | 6/2000 | Chengalvarayan .......... 704/256 |
| 6,076,088 A | 6/2000 | Paik et al. ..................... 707/5 |
| 6,078,914 A | 6/2000 | Redfern ......................... 707/3 |
| 6,088,692 A | 7/2000 | Driscoll ......................... 707/5 |

FOREIGN PATENT DOCUMENTS

WO    WO 01/33414 A1 * 10/2000

OTHER PUBLICATIONS

"Creating Multiple Choice Type Questions", URL address: http://itsinfo.tamu.edu/workshops/handouts/pdf_handouts/multiple_choice_questions.pdf, May 9, 2001.*
Hearst, Marti A. et al, "Subtopic Structuring for Full-Length Document Access."□□SIGIR 1993, pp. 59-68.*
G. Salton, et al., "Automatic Analysis, Theme Generation and Summarization of □□Machine-Readable Texts," Science, vol. 264, Jun. 3, 1994□□.*

(Continued)

*Primary Examiner*—V. Paul Harper
(74) *Attorney, Agent, or Firm*—Kris T. Fredrick

(57) ABSTRACT

Systems and methods for classifying natural language (NL) sentences using a combination of NL algorithms or techniques is disclosed. Each NL algorithm or technique may identify a different similarity trait between two or more sentences, and each may help compare the meaning of the sentences. By combining the various similarity factors, preferably by various weighting factors, a distance metric can be computed. The distance metric provides a measure of the overall similarity between sentences, and can be used to assign a sentences to an appropriate sentence category.

38 Claims, 11 Drawing Sheets

OTHER PUBLICATIONS

G. Salton, C. Buckley, "Automatic Text Structuring and Retrieval—Experiments in Automatic ☐☐Encyclopedia Searching" Proc. of the 14th International ACM/SIGIR Conf. on Research and Development in Information Retrieval, pp. 21-30 ACM New York, 1991.*

Salton, et al., "Global Text Matching for Information Retrieval," Aug. 30, 1991, Science, vol. 253, pp. 1012-1015.*

U.S. Appl. No. 09/522,483, filed Mar. 10, 2000, entitled "Trainable, Extensible, Automated Data-To-Knowledge Translator".

Claire Grover et al., http://www.ltg.ed.ac.uk/software/ttt/tttdoc.html, "TTT: Text Tokenisation Tool", dated prior to Jun. 29, 2001, 67 pages.

http://www.inxight.com/products_eu/index.html, "Inxight Software—Products for End Users" dated prior to Jun. 29, 2001, 1 page.

http://www.inxight.com/products_sp/index.html, "Inxight Software—Products for Software Producers", dated prior to Jun. 29, 2001, 2 pages.

http://www.inxight.com/products_wb/index.html, "Inxight Software—Products for Web Builders" dated prior to Jun. 29, 2001, 2 pages.

http://bobo.link.cs.cmu.edu/dougb/playground.html, "The Natural Language Playground", dated prior to Jun. 29, 2001, 2 pages.

http://dir.yahoo.com/Computers_and_Internet/Software/Natural_Language_Processing/, "Yahoo! Computers and Internet > Software > Natural Language Processing", dated prior to Jun. 29, 2001, 1 page.

http://bobo.link.cs.cmu.edu/grammar/html/dict/summarize-links.html, "Summary of Link Types", dated prior to Jun. 29, 2001, 7 pages.

http://bobo.link.cs.cmu.edu/grammar/html/, "Link Grammar", dated prior to Jun. 29, 2001, 2 pages.

http://www.attensity.com/data/index_support/menu.html, "Untitled Document" dated prior to Jun. 29, 2001, 1 page.

http://www.cs.utexas.edu/users/kbarker/thesis/, Ken Barker, Ph.D. Thesis Page, "Semi-Automatic Recognition of Semantic Relationships in English Technical Texts", dated Jul. 18, 1998, 151 pages.

* cited by examiner

— Do a check and repair the unserviceable wiring.
— Repair the above wiring.
⇒ Repair, the, wiring ⇒ 3/8 ⇒ 0.375

*FIG. 5*

—Do_VB a_DT check_NN and_CONJ repair_VB the_DT unserviceable_ADJ wiring_NN
—Repair_VB the_DT above_ADJ wiring_NN
⇒ Repair_VB, wiring_NN
⇒ [ Σω($w_i$) ] / n
⇒ ( 2.0 + 1.0 ) / 4 ⇒ 0.75

*FIG. 6*

— [Do_VB][a_DT check_NN] and_CONJ [repair_VB] [the_DT unserviceable_ADJ wiring_NN].

— [Repair_VB] [the_DT above_ADJ wiring_NN].

$\Rightarrow$ repair $\Rightarrow$ ($\omega$(*verb*) 2.0 * *ct* 1) / 1 $\Rightarrow$ 2.0

$\Rightarrow$ wiring $\Rightarrow$ ($\omega$(*noun*) 1.0 * *ct* 1) / 1 $\Rightarrow$ 1.0

$\Rightarrow$ 1/n * [ $\Sigma$ $\omega$(p$_i$) * score(p$_i$) ]

$\Rightarrow$ 1/4 * (2.0 * 2.0 + 1.0 * 1.0) = 1.25
$\quad\quad\;\;\omega$(*VP*) $\quad\quad\quad\;\;\omega$(*NP*)

FIG. 7

| | | |
|---|---|---|
| 1.00 | fault | repair |
| 0.95 | no-fault | check |
| 0.98 | fault | replace |
| 1.00 | fault | install |

FIG. 8

—Do a check and repair the unserviceable wiring.
—Repair the above wiring.
⇒ repair (+1), check (-0.95)/2 ⇒ 0.05/2 ⇒ 0.025

FIG. 9

$$D_{pq} = \sum_{i=1}^{N} w_i d_i; \text{ where } d_i \text{ may equal } \sum_{i=1}^{i-1}\sum_{j=1} w_{ij}d_j$$

FIG. 10

- Do a check and repair the unserviceable wiring.
- Repair the above wiring.

| | Score | Weight | Weight | Weight |
|---|---|---|---|---|
| d₁: Overlap | 0.375 | 1.0 | 0.0 | 1.0 |
| d₂: Keywords | 0.75 | 1.0 | 1.0 | 2.0 |
| d₃: Phrases | 1.25 | 1.0 | 2.0 | 0.0 |
| d₄: Model | 0.025 | 1.0 | 1.0 | 2.0 |
| Total | | 2.40 | 3.275 | 1.90 |

*FIG. 11*

METHOD AND APPARATUS FOR DETERMINING A MEASURE OF SIMILARITY BETWEEN NATURAL LANGUAGE SENTENCES

FIELD OF THE INVENTION

The present invention generally relates to methods and systems for classifying natural language text or sentences, and more particularly to methods and apparatus for determining a measure of similarity between natural language sentences or text.

BACKGROUND OF THE INVENTION

Computers and computer technology have contributed greatly to our personal and professional lives. Computers now help perform many tasks that were previously performed by humans only a few years ago. While computer systems and computer technology have made significant penetration into our lives, some tasks still require significant human intervention.

A recurring problem in the computer field is the difficulty of developing computer systems that can perform tasks that have complex, unpredictable or undefined input data. To date, these tasks typically require human intervention, and often, intervention by scarce human workers that have particular knowledge or expertise. An essential problem is the translation of knowledge and skill of a human expert to a computer system in such a manner that the computer system, when provided with the same fact pattern, reaches the same conclusion or decision as the expert.

The first implementations of such systems used conventional, sequential computers that perform a sequence of operations on a very limited number of data elements, such as an add or compare operation of two data elements. A sequential system that works with large numbers of data elements often requires prohibitively long computation times, even for very fast computer systems.

To reduce the number of data items to be dealt with, "expert" systems have been developed. One form of "expert" system attempts to implement human "expertise" in a number of rules. In a rule based expert system, knowledge engineers attempt to elicit from experts a set of rules that implement the reasoning of the experts when given a set of facts. The rules typically attempt to codify, for example, the knowledge, methodology and reasoning process used by experts to solve a particular problem. The rules are programmed as a sequence of decision steps and, given a fact pattern, the system executes the programmed sequence of rule decisions in an attempt to reach the same conclusion as the expert.

A limitations of such rule based "expert" systems is that much of the expertise expressed in the rules is based on knowledge from a large number of individual fact patterns, which are of necessity and purpose more general than individual cases. This results in a loss of a significant amount of information. In addition, it is often difficult to determine whether the correct set of rules has been implemented, particularly since many experts do not consciously know and understand their own methodology and reasoning processes, and may unconsciously create "rules" that do not in fact reflect their methodology.

Another limitation of many rule based "expert" systems is that a substantial investment of knowledge engineer and expert time is required to determine and implement the appropriate set of rules. Furthermore, if the rules do not produce a desired result, or the input data changes in a material way, rewriting or updating the rules is often an extremely difficult and time consuming process. The rules often interact with one another, and a change in one rule may require corresponding changes in other related rules.

One application where such difficulties have arisen is in generating knowledge repositories (or data bases) from legacy documents. Many companies are currently processing legacy documents for use in automated reasoning systems. In one example, a knowledge repository may be used as a diagnostic fault model for an airplane. In another example, a knowledge repository may describe company business practices.

In order to create a knowledge repository, the legacy documents are typically parsed and the relevant information is identified, often by hand. Some of the information can be easily identified from the document context or by pattern-matching techniques. However, much of the information can be more efficiently and accurately identified by having some level of understanding of the textual meaning of the information in the document. To illustrate this, it is known that some legacy maintenance manuals may include certain fault descriptions. To identify and extract the fault descriptions from the the legacy document, some level of understanding of the meaning of the text within the document would be extremely helpful. For example, the sentence "REPLACE THE GO-AROUND SWITCH, S2 ON THE RIGHT THRUST LEVER" may describe a fault, while "DO THE IRU BITE PROCEDURE (MM 34-21-00, FIG. 107)" may describe a procedure.

It is known that English sentences are extremely complex, and are subject to stylistic variation. Using tediously hand-generated rules that rely on regular expressions to identify the fault statements would be extremely difficult. In general, the more complex the pattern, the more difficult it is to write a regular expression to recognize the pattern. Thus, not only would it be difficult to generate rules that rely on regular expressions to identify fault statements with a legacy document, but such a system would likely be dependent on the writing style of the author, making it difficult to transfer the hand-generated rules and/or regular expressions to different legacy documents or even to different chapters within the same document. Thus, such systems may be highly brittle and error-prone. Because of the foregoing, there is often a large cost associated with creating knowledge repositories from legacy documents.

The field of search engines is another application where it is often desirable to identify and categorize certain information within documents. Search engines typically accept a user specified search expression, and compare the search expression to text in selected documents, databases or web pages. Using rules or regular expressions to identify and categorize text within documents can be difficult, time consuming, and tedious.

SUMMARY OF THE INVENTION

The present invention provides improved systems and methods for classifying natural language text or sentences by first determining a measure of similarity between natural language sentences or text. The present invention preferably uses Machine Learning (ML) algorithms to categorize and/or identify the similarity between sentences. The ML algorithms are preferably trainable, so that they can be easily customized to any particular domain. By using trainable ML algorithms, the system may be incremental and robust, which allows the accuracy of the system to be increased with additional training. One embodiment of the present invention exploits the semantic information captured by Natural Language Processing (NLP) techniques along with statistical modelling to calculate the similarity between texts.

It is believed that the present invention may provide as much as a 10-fold reduction or more in the time required to accurately categorize sentences in certain legacy documents, resulting in a cost reduction of 30% to 50%. It is also believed that the present invention may be used to substantially increase the accuracy of many search engines.

In one illustrative embodiment, the present invention is applied to categorizing sentences in a legacy document to ultimately generate a knowledge repository. In this embodiment, a number of training sentences are selected, and one or more ML algorithms are used to assign each of the training sentences to one or more predefined categories. The algorithms are preferably dependent on a number of operating parameters (e.g., weights) over its constituent components. Once assigned, a correspondence is displayed between each of the training sentences and each of the one or more predefined categories. A user may then review the categorization of each of the training sentences, and change the categorization where appropriate. Based on the changes made by the user, the algorithm updates the operating parameters to reflect the change in the assigned categories, resulting in one iteration of training. Thereafter, the algorithm may be further trained by repeating the assigning, displaying, changing and updating steps until a desired accuracy level is achieved. Once adequately trained, all of the sentences in a legacy document may be processed.

The assigning step described above preferably uses a distance metric to determine which predefined category to assign a particular sentence. For example, the distance metrics can provide a measure of similarity between a particular sentence and one or more sentences that have already been assigned to a particular category. The particular sentence is preferably assigned to the category that includes the training sentences that are most similar to it. One possible assignment is to assign the sentence to the category of the single most similar sentence (smallest distance). Another possible assignment is to assign the particular sentence to the category that contains the majority of the k most similar sentences.

There are a number of illustrative algorithms for determining a measure of similarity between a first sentence and a second sentence. One illustrative method calculates the similarity between a pair of sentences based on inputs from several similarity factors. The final similarity value is preferably calculated by a weighted combination of each of the constituent similarity factors. The constituent similarity factors may be functions or methods based on sentence grammar, sentence semantics, statistics, or other specific techniques developed for the language or domain. Some illustrative methods or functions may include, for example, a string match, a keyword match, a phrase match, or a match based on the statistical significance of words, or a domain model match.

In order to utilize sentence grammar or semantics as a basis for a similarity factor, the sentences are preferably first parsed by a Natural Language Parsing engine. The NLP engine preferably assigns words to their pre-defined grammatical categories (e.g. nouns, verbs, adjectives, . . . ). The engine may also build complete sentence diagramming trees (e.g. noun phrase, prepositional phrase, . . . ). The engine may also assign words to pre-defined semantic categories (e.g. subject, object, modifier, . . . ). The NLP may also identify other natural language elements, including for example, proper names, currency, or sentence voice (passive/active).

The information extracted by the NLP engine can then be used by any number of similarity factors to assist in the calculation of the similarity between sentences. It is believed that by calculating the natural language properties of the text, and then comparing words or groups of words from similar classes, a more accurate estimation of the similarity of the sentences can be achieved. Some illustrative methods or functions include, for example, a string overlap match, a keyword match, and a phrase match.

The string overlap match function may contribute to the measure of the overall similarity of the two sentences by identifying the number of overlapping words in the sentences, regardless of word type or class. For example, the string overlap match function may return the number of words in the first sentence that match a word in the second sentence, as a percentage of the number of words in the longest of the first sentence and second sentence.

The keyword match function may provide a measure of the overall similarity of the two sentences by identifying the number of overlapping words in the sentences, where only words with a common syntactic or semantic type are compared. For example, the keyword match function may return the number of words in the first sentence that match a word in the second sentence, where both words share a common type, as a percentage of the maximum number of keywords in the first sentence and the second sentence. The phrase match function may be similar to the keyword match function, but may be applied to phrases or words. This method allows, as one possible example, noun phrases to be compared, including (or not) information from any constituent prepositional phrases.

Other techniques may be incorporated to improve the robustness of the natural language metrics. For example, to compensate for spelling errors or the like, it is contemplated that a word in the first sentence may be deemed to match a word in the second sentence when, for example, the word in the first sentence and the word in the second sentence each exceed a minimum number of characters, and the word in the first sentence shares a predetermined minimum number of characters with the word in the second sentence. Similarly, words or phrases may be considered similar if they are related according to some pre-defined knowledge (either domain dependent or independent). For example, the related words may include an original word with the prefix or suffix removed, various tenses of the original word, and/or different words with similar meanings as identified by, for example, a domain thesaurus. In addition, it is contemplated that one or more named entities may be extracted from the first sentence and the second sentence; the named entities may include a complex groups of nouns. The named entities may then be treated as a single object when performing word or phrase comparisons.

A second general category or factor that can be used for the overall similarity metric is statistical information. Certain words are more common or more indicative of a sentence's meaning than other words. For example, the general noun "thing" indicates much less meaning about a sentence than a more specific noun. Statistical information can be gathered from the language the text was written in (i.e. a general database of word usage), or built from the text under consideration (i.e. domain-specific). There are different methods of building and using this statistical information; one possible technique is to calculate the correlation factor of words in the training text to the category of the sentence, and this correlation factor can then be used to predict the category of new sentences. In the current embodiment, the statistical information is captured in a domain model that returns a similarity value, wherein the similarity value is increased by the correlation factor of a model word when both sentences include the model word, and is decreased by the correlation factor of a model word when only one of the first and second sentences include the model word. By decreasing the similarity value when only one of the two sentences includes the model word, a negative probability or correlation is applied.

Statistical information can augment the natural language metric, and vice versa. For example, extremely common words (and hence information-free words) can be identified as "stop" words by the statistical methods, and then the natural language methods can exclude them from the similarity analysis. Inversely, the natural language information can be used to augment the statistical calculation, such as when a word can be used as both a noun and a verb; each type of usage may have a different statistical correlation.

The two above-mentioned categories of similarity factors (natural language and statistical) and any combinations are independent of the domain of the text. In some domains, there may be domain-specific information that will augment the accuracy of the similarity metric. In one embodiment, for example, certain airline maintenance words are "more interesting" to the human users of the system than others. Any domain-specific factors can be added to the similarity metric in the same manner as the domain-independent factors, and moreover, factors that mix the domain-independent methods with domain-dependent methods can be created.

Each of these factors can then be combined to create a measure of the similarity of two sentences. The metric is flexible enough to incorporate any additional techniques as they are designed or developed. Each factor contributes to the final measure through a weighted function that can be tuned to the domain under consideration.

While the above illustrative embodiments may be used to categorize sentences in legacy documents, other applications are also contemplated. For example, the illustrative algorithms of the present invention may be applied to search engines. Often, search engines compare the similarity of a search expression with sentences or to text in search documents. The present invention can advantageously perform such a comparison, using some notion of the meaning of the sentences to be compared, which in many applications is highly desirable.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 5 is a diagram showing the calculation of a similarity factor between two sentences using an illustrative string overlap function;

FIG. 6 is a diagram showing the calculation of a similarity factor between two sentences using an illustrative keyword match function;

FIG. 7 is a diagram showing the calculation of a similarity factor between two sentences using an illustrative phrase match function;

FIG. 8 is table showing illustrative correlation factors for several model words;

FIG. 9 is a diagram showing the calculation of a similarity factor between two sentences using an illustrative model match function;

FIG. 10 is a diagram showing the calculation of an illustrative distance metric in accordance with a preferred embodiment of the present invention;

FIG. 11 is a table showing the calculation of the distance metric of FIG. 10 using the similarity factors of FIGS. 5, 6, 7 and 9 and various weighting factors.

DETAILED DESCRIPTION OF THE PREFERRED EMBODIMENTS

Figure 1:
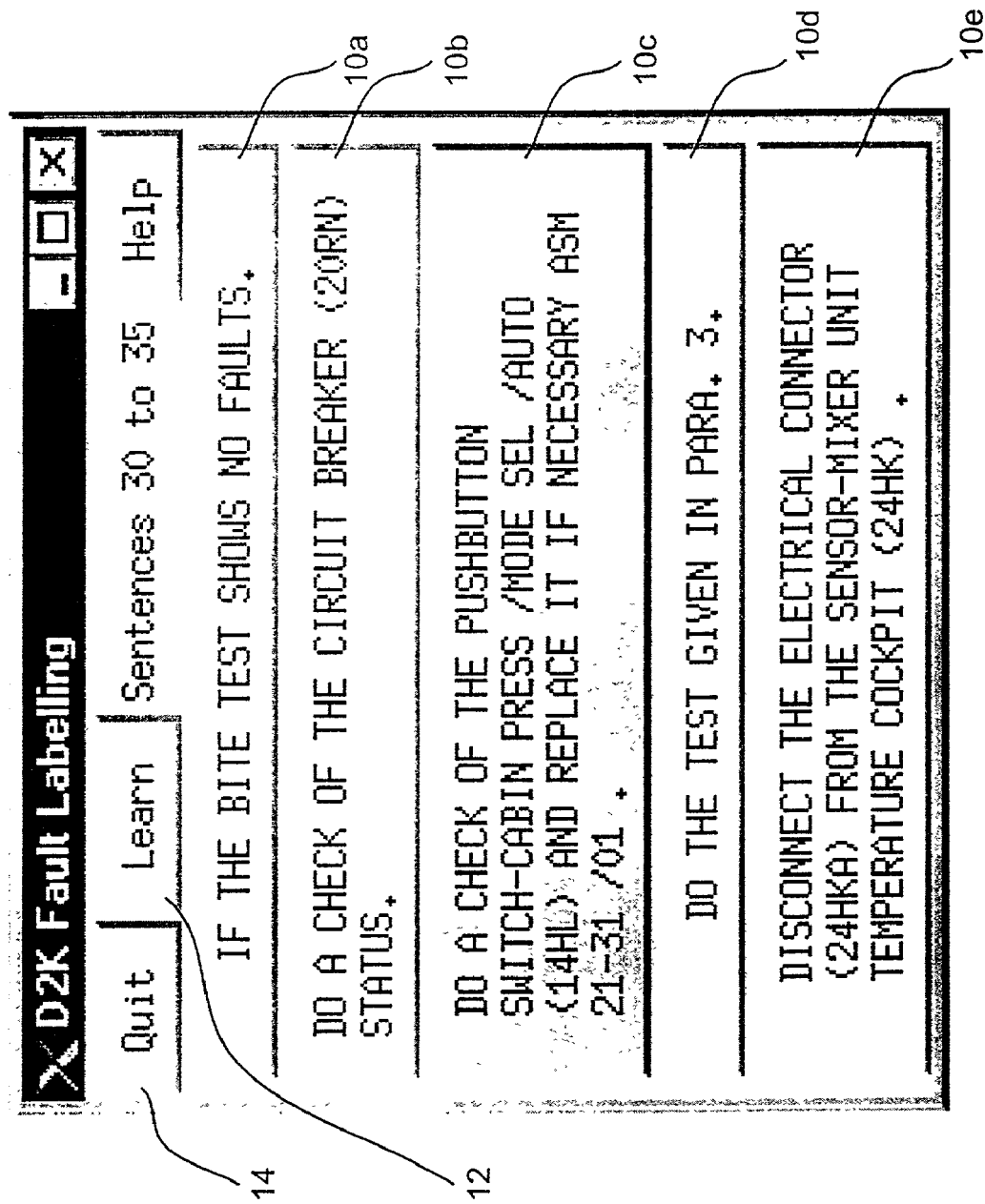
FIG. 1 is a screen shot of an illustrative graphical user interface in accordance with the present invention.

FIG. 1 is a screen shot of an illustrative graphical user interface in accordance with the present invention. The illustrative graphical user interface provides an interactive and iterative environment for machine learning in the context of placing sentences into desired categories. At each iteration of the learning process, the user is presented with a set of sentences, which are highlighted with best guesses for sentence classification. In FIG. 1, a number of training sentences are displayed at 10a–10e, with the "fault" type sentences, such as sentence 10c, highlighted as shown. The user may then make any necessary corrections, preferably by clicking on the appropriate sentences to toggle the highlights. Control is then returned to the ML learner by depressing the learn button 12. The ML learner then tunes one or more weights and/or other operating parameters to the new correlation data. The algorithm then uses all previously labeled sentences including those just categorized by the user, and categorizes a next set of sentences. This may be repeated until the desired accuracy is achieved. When the user quits via the quit button 14, the algorithm may categorize all remaining sentences in the document.

Figure 2:
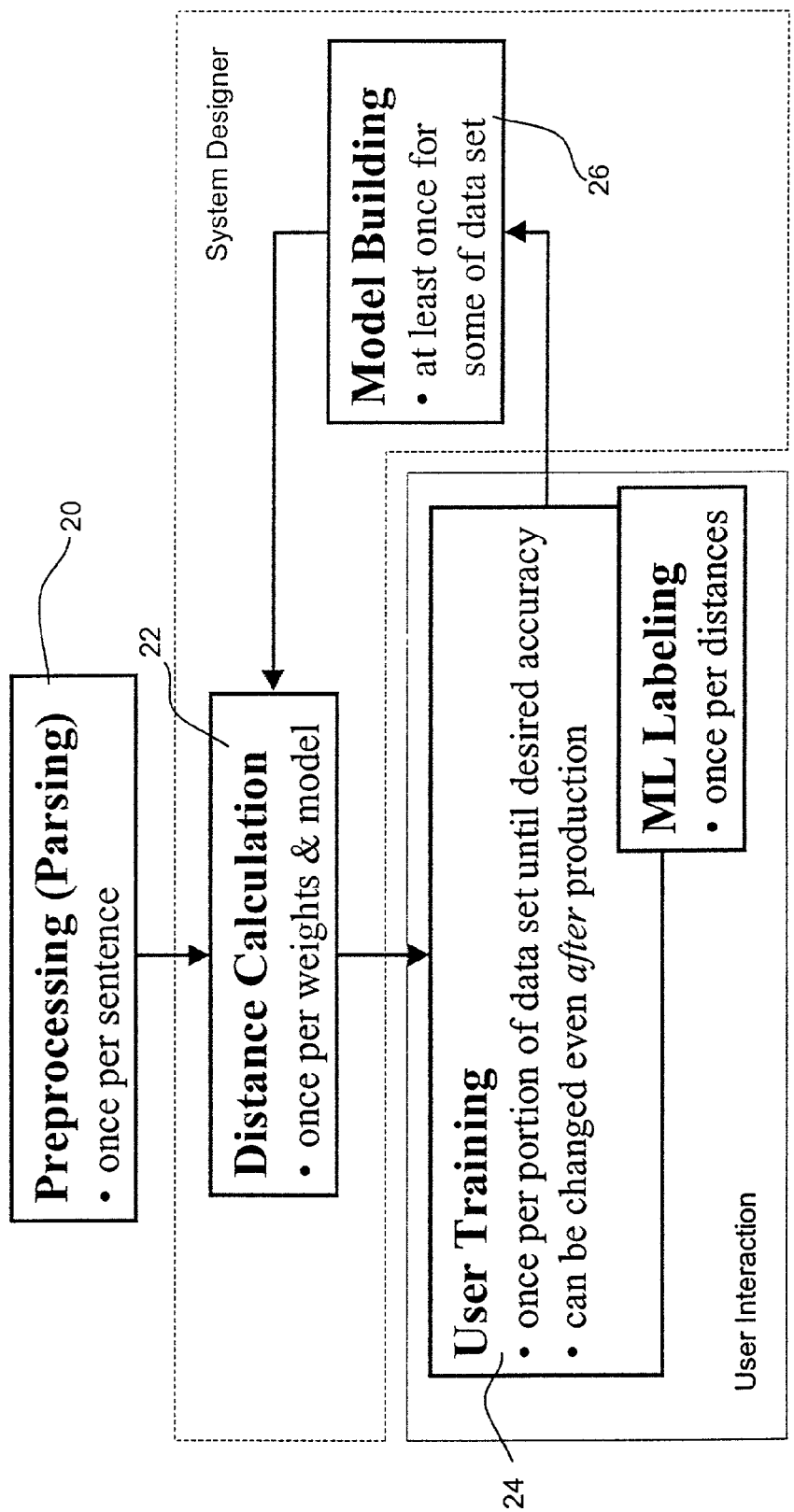
FIG. 2 is a schematic diagram showing the architecture of an illustrative embodiment of the present invention.

FIG. 2 is a schematic diagram of the architecture of an illustrative embodiment of the present invention. Before the ML algorithm is applied, every sentence in the document is initially parsed, as shown at 20. Each sentence is parsed to identify, for example, words, parts-of-speech, phrases, etc. Any parser or tagger may be used. One illustrative parser is known as the Text Tokeniser Toolkit (TTT), which is available from the Language Technology Group of the University of Edenburgh, located in Edenburgh, Scotland. Another illustrative parser is known as the Link Grammar Parser (LGP), available from Carnegie Mellon University, Pittsburgh, Pa. Yet another illustrative parser is Barker's ML-based semantic recognizer, described in Ken Barker's PhD thesis, Ottawa-Carleton Institute for Computer Science, University of Ottawa, Ottawa, Ontario, June 1998. Others are also available.

For some documents, such as maintenance manuals, there are often many grammatical oddities. At a minimum, many maintenance manuals are not written with standard English, but rather often contain abbreviations and/or strange structure. For example, some maintenance manuals may contain parenthetical cross-references, and a large vocabulary unfamiliar to standard parsers. Moreover, sentences may be truncated by the character recognition software used to read the manuals into computer readable form. It has been found that TTT parses these sentences reasonably well, giving fairly accurate part-of-speech tags and syntactic chunks. The LGP provides a reasonable identification of prepositional phrases.

After parsing each sentence, block 22 calculates pair-wise distance metrics between sentences. Then, and as shown at block 24, a small set of sentences are presented to the user for labeling, such as described above with respect to FIG. 1. The labels are used to build a statistical domain model (e.g., word-to-category correlations), as shown at block 26. The domain models may also help identify, for example, a set of appropriate weights and/or operating parameters to tune the metric to the relevant data set.

Using the tuned metric, the user may enter into a full interactive training mode. The ML algorithm presents the user with a set of training sentences, along with an estimated category for each sentence. The user can make any necessary corrections. After the corrections are made, the ML algorithm may update the model, and then categorize another set of sentences. This iterative process may continue until the user is satisfied with the accuracy of the model. The ML algorithm may then be allowed to categorizes all remaining sentences in the document.

The fully categorized sentences can be used to build fault models for automated reasoning systems. Even after a fault model has been built, the user can still make corrections to the sentence categorizations via block 24 to produce an updated model via block 26. This may be used to increase the accuracy of sentence categorization at any time.

Figure 3:
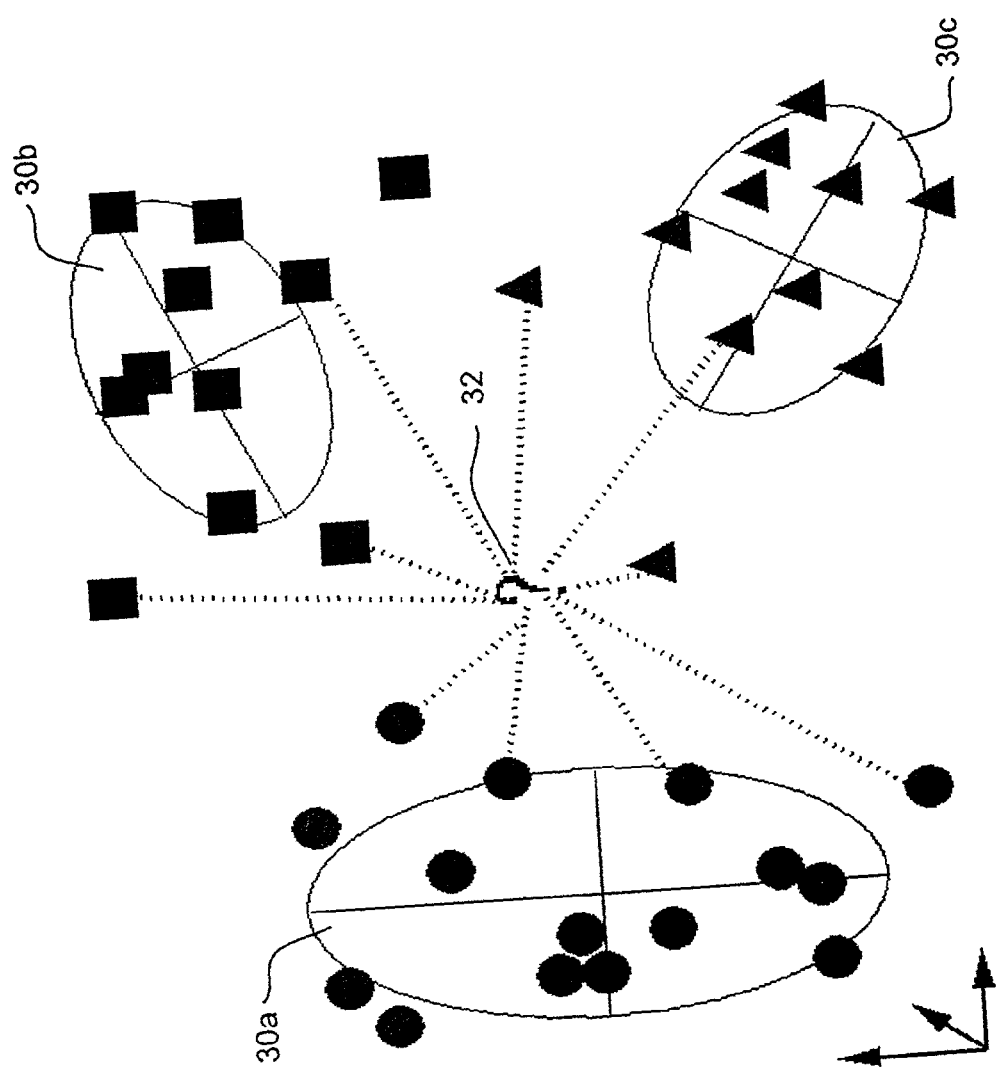
FIG. 3 is a high level diagram showing an illustrative algorithm for assigning sentences to one of several categories.

FIG. 3 is a high level diagram showing an illustrative algorithm for assigning sentences to one of several categories. The ML algorithm of the present invention builds clusters of training examples according to their labeled categories. The n-dimensional clusters 30a–30c depend on features of each categorized sentence in the training examples. For each new target sentence, such as sentence 32, the ML algorithm may select a category 30a–30c based on the similarity of the target sentence 32 to each of the categorized sentences in the training examples. The categorized sentences in the training examples are represented by dots, squares and triangles in FIG. 3. The similarity between the target sentence 32 and the categorized sentences is preferably calculated using the measure of similarity, or distance metric, as described herein.

The distance metric is preferably a mathematical combination of a set of relevant high-level features that are transformed from a low-level feature space, e.g., the statistical domain model and the natural language parse information. The transformation preferably enables a knowledge-based distance-metric to be built, i.e., one that uses knowledge about the structure and meaning of the sentence. Such a distant metric may enable the ML algorithm to powerfully differentiate between sentence categories.

One approach for building the distance metric is to leverage recent advances in Natural Language processing technology. Other domain information may also be leveraged wherever possible. By combining one or more NL processing techniques, along with statistical models and any other available information, a single distance metric may be constructed that sufficiently differentiates between sentence categories.

In one illustrative embodiment, several NL techniques and statistical information are used to provide similarity factors for the distance metric. Some of the NL techniques may include parts-of-speech tagging and syntactic chunks. Parts-of-speech tagging identifies nouns, adverbs, adjectives, etc. in the sentences. Syntactic chunks identify such things as noun phrases, prepositional phrases and verb phrases.

Figure 4:
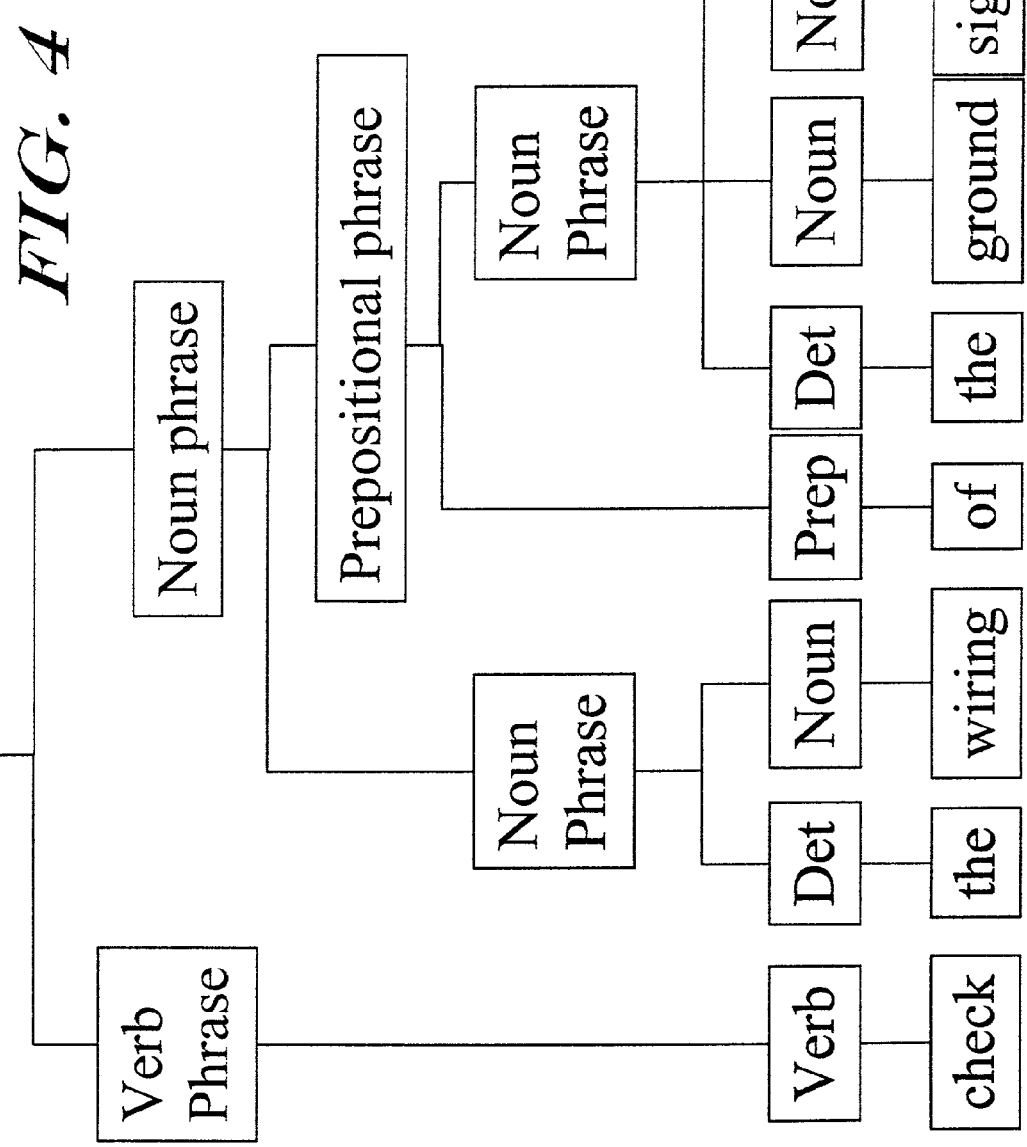
FIG. 4 is a schematic diagram showing a sentence diagram of a sentence using a natural language parser.

FIG. 4 is a schematic diagram showing the sentence diagram of a sentence using a natural language parser. A part-of-speech tagger may identify and tag the various parts-of-speech in each sentence. The parts-of-speech may include, for example, nouns, adverbs, adjectives, articles, etc. Referring to FIG. 4, in the sentence "Check the wiring of the ground signal", the word "the" is a determiner, "of" is a preposition, the words "wiring", "ground" and "signal" are nouns, and the word "check" is a verb. A parser may provide additional natural language syntactic information such as noun, verb and prepositional phrases, and also semantic information such as subject and object. A parser may provide an output of "(check_VB) [ [ the_DT wiring_NN ] of_PP [the_DT ground_NN signal_NN ] ], where each of the words has a suffix that identifies the part-of-speech of each word, each noun phrase is enclosed in square brackets and each verb phrase is enclosed in parentheses.

A word model may also be developed and used. A word model is a statistical analysis of word-to-category correlations. Each of these techniques help identify relevant parts of the sentences. By using one of more of these NL techniques, a single distance metric may be constructed that sufficiently differentiates between sentence categories.

A number of illustrative methods for calculating similarity factors for use in some distance metric calculations are now discussed. FIG. 5 is a diagram showing the calculation of a similarity factor between two sentences using a string overlap function. The illustrative string overlap function calculates how many words match between a first and second sentence, as a percentage of the number of words in the longest of the two sentences. Referring to FIG. 5, and for illustration purposes, a first sentence may be "Do a check and repair the unserviceable wiring", and a second sentence may be "Repair the above wiring" The words that match between the two sentences are "Repair", "the" and "wiring". The maximum number of words in the longest sentence is eight (8). Thus, the similarity factor produced by the string overlap function is ⅜, or 0.375.

To reduce the effects of spelling errors, stylistic changes, abbreviations, and other variations, a longest common subsequence (LCS) technique may be used when comparing the word in each sentence. The LCS technique may, for example, accept a pair of word as equal if each of the words has at least four (4) letters and the words share more than 80% of their characters.

A keyword match function may contribute to the similarity metric by comparing only words of the same part-of-speech "type"; hence the similarity of the meaning of the two sentences can be more accurately determined, as further shown and described below. FIG. 6 is a diagram showing the calculation of a similarity factor between two sentences using an illustrative keyword match function. A keyword is a particular part-of-speech "type" as described above. The illustrative keyword match function calculates how many keywords match between the two sentences, as a percentage of the maximum number of keywords in the longest sentence. A keyword match occurs when the keyword types are equal and the words match according to the longest common subsequence (LCS) technique described above. To increase the importance of certain part-of-speech "types", weights can be applied to each of the keyword types (e.g., noun, verb, adverb, etc).

Referring to FIG. 6, and for illustration purposes, the same two sentences described above with reference to FIG. 5 are used. Namely, and after being processed by the part-of-speech tagger, the first sentence recites "Do_VB a_DT check_NN and_CONJ repair_VB the_DT unserviceable_ADJ wiring_NN", and the second sentence recites "Repair_VB the_DT above_ADJ wiring_NN". In this example, verbs are assigned a weight of 2.0, nouns are assigned a weight of 1.0, and all other word types are assigned a weight of zero. Since the _DT, _CONJ and _ADJ word types have a weight of zero, they do not contribute to the overall similarity factor produced by the keyword match function. The words that match between the two sentences and have the same word type are thus "Repair_VB" and "wiring_NN". In addition, the maximum number of keywords in either sentence (with a non-zero weight) is four (4). Thus, the similarity factor produced by the illustrative keyword match function is (2.0+1.0)/4, or 0.75.

A phrase match function may contribute to the similarity metric by comparing only phrases of the same type, hence the similarity of the meaning of the two sentences can be more accurately determined, as further shown and described below. FIG. 7 is a diagram showing the calculation of a similarity factor between two sentences using an illustrative phrase match function. The illustrative phrase match function calculates how many phrases match between the two sentences, as a percentage of the maximum number of phrases in the longest sentence. Like the keyword match function discussed above, a phrase match may occur when the phrase types are equal and the phrases match according to a longest common subsequence (LCS) technique, as described above. To increase the importance of certain phrase "types", weights can be applied to each of the phrase types (e.g., noun-phrase, verb-phrase, prepositional-phrase, etc). Within each phrase, the overlap or keyword match functions may be applied.

Referring to FIG. 7, and for illustration purposes, the same two sentences described above with reference to FIG. 5 and FIG. 6 are used. Namely, and after being processed by the part-of-speech and grammar tagger, the first sentence recites "(Do_VB) [a_DT check_NN] and_CONJ (repair_VB) [the_DT unserviceable_ADJ wiring_NN]", and the second sentence recites "(Repair_VB) [the_DT above_ ADJ wiring_NN]". In this example, verb-phrases are assigned a weight of 2.0, noun-phrases are assigned a weight of 1.0, and all other phrase types are assigned a weight of zero. Also in this example, a longest common subsequence (LCS) technique is used only requiring 80% of the characters to be the same. The two verb phrases from the first sentence are compared with the one verb phrase from the second sentence; the longest common subsequence (LCS) algorithm is applied over the keywords in each phrase, yielding a match between the "repair" words (total weight 2.0). The two noun phrases from the first sentence are compared with the one noun phrase from the second sentence; the longest common subsequence (LCS) algorithm is applied over the keywords in each phrase, yielding a match between the "wiring" words (total weight 1.0). The maximum number of phrases in either sentence (with a non-zero weight) is four (4). Thus, the similarity factor produced by the illustrative phrase match function is (2.0 (the weight of verb phrases)*2.0 (one verb match found in the phrases, with weight of 2.0)+1.0 (the weight of noun phrases)*1.0 (one noun match found in the phrases))/4, or 1.25.

Another illustrative method for calculating a similarity factor between two sentences uses a model match function. In this particular embodiment, the model match function uses a statistical model that is based on word-to-category statistics based on the observation that certain words or phrases tend to correlate strongly to a particular sentence category. For example, the words "repair", "replace" and "install" may correlate strongly to "fault" type statements in a maintenance manual, while the words "test", "procedure" and "check" may correlate strongly to no-fault type statements.

FIG. 8 is table showing some illustrative correlation factors for several model words including the words repair, check, replace and install. The word "repair" has a correlation factor of 1.00 to "fault" type statements. The word "check" has a correlation factor of 0.95 to "no-fault" type statement. The word "replace" has a correlation factor of 0.98 to "fault" type statements, and the word "install" has a correlation factor of 1.00 to "fault" type statements. The statistical model may capture NL information to distinguish between different uses of the same word (e.g. "service" may appear as a noun or a verb).

Using these correlation factors, an illustrative model match function may return a similarity value between the two sentences. In doing so, a similarity value is initialized to zero, and is increased by the correlation factor of a model word when both the first sentence and the second sentence include the model word, and is decreased by the correlation factor of a model word when only one of the first or second sentences include the model word. The similarity value may be divided by the number of model words detected in either of the sentences, if desired. By decreasing the similarity value when only one of the first and second sentences include the model word, a negative probability or correlation is applied. This method has proven to be fairly powerful in categorizing sentences.

FIG. 9 is a diagram showing the calculation of a similarity factor between two sentences using the correlation factors shown in FIG. 8. For illustration purposes, the same two sentences described above with reference to FIG. 5, FIG. 6 and 7 are used. Both sentences include the word "repair", but only the first sentence includes the word "check". Neither of the sentences include the words "replace" or "install". Thus, the illustrative model match function may return a value of (repair $$(+1)+\text{check }(-0.95))/2=0.05/2=0.025.$$

The various sentence similarity values discussed above may be combined to calculate a distance metric. FIG. 10 is a diagram showing the calculation of an illustrative distance metric. The illustrative distance $D_{pq}$ 46 between two sentences p and q is determined by a weighted sum of the votes of each underlying technique. In FIG. 10, "$d_1$" may correspond to the similarity factor calculated using the string overlap function, "$d_2$" may correspond to the similarity factor calculated using the keyword match function, "$d_3$" may correspond to the similarity factor calculated using the phrase match function, and "$d_4$" may correspond to the similarity factor calculated using the model match function. Each of the similarity factors is weighted by a corresponding weighting factor $w_i$.

As shown at 48, some of the similarity factors $d_i$ may rely on some of the information provided by one or more of the other similarity factors $d_j$. When so provided, separate weights $w_{ij}$ may be applied to each of the techniques, if desired. In one example, the similarity factor "$d_3$" for the phrase match function may rely on the similarity factor "$d_2$"

of the keyword match function, if desired. Experiments were conducted with several of the above ML techniques, and obtained the best results from a nearest-neighbor approach, using k=10 neighbors and a weighted distance voting strategy.

FIG. 11 is a table showing the calculation of the distance metric $D_{pq}$ 46 of FIG. 10 using the similarity factors calculated with reference to FIGS. 5, 6, 7, and 9. The two sentences used to calculate the illustrative similarity factors in FIGS. 5, 6, 7, and 9 are reproduced along the top of FIG. 11. The first column of FIG. 11 recites the four illustrative techniques described above, including the string overlap function 50, the keyword match function 52, the phrase match function 54 and the model match function 56. The second column, labeled "score", recites the similarity factors calculated for each of the NL techniques. The third column 60 includes a first set of illustrative weights $w_i$ for each of the NL techniques, wherein all the weights are the same and equal to one. Using these weights, the distance metric $D_{pq}$ 46 of FIG. 10 produces a distance metric value of 2.40, as shown at 62.

The fourth column 64 includes a second set of illustrative weights $w_i$ for each of the NL techniques, wherein the string overlap function has a weight of 0.0, the keyword match function and model match function of a weight of 1.0, and the phrase match function has a weight of 2.0. Using these weights, the distance metric $D_{pq}$ 46 of FIG. 10 produces a distance metric value of 3.275, as shown at 66. Finally, the fifth column 68 includes a third set of illustrative weights $w_i$ for each of the NL techniques, wherein the string overlap function has a weight of 1.0, the keyword match function and model match function of a weight of 2.0, and the phrase match function has a weight of 0.0. Using these weights, the distance metric $D_{pq}$ 46 of FIG. 10 produces a distance metric value of 1.9, as shown at 70. During the learning process described above, the weights $w_i$ for each of the techniques are preferably updated to reflect the current categorization of sentences.

The above-described NL techniques are only meant to be illustrative and that numerous other possible techniques can be used in the present invention. For example, to improve the robustness of the system, it is contemplated that related words may be identified and added to a sentence. The related words may include, for example an original word with the prefix or suffix removed, various tenses of the original word, and/or different words with similar meanings as identified by, for example, a domain thesaurus. In addition, it is contemplated that one or more named entities may be extracted from the first sentence and the second sentence; the named entities may include a complex groups of nouns. The named entities may then be treated as a single object when performing word or phrase comparisons. In some embodiments, one or more stop words may also be excluded from the first and second sentences. The stop words may be identified in a predefined stop list, and may include common words that are not likely to help identify the similarity of the first and second sentences.

Figure 12:
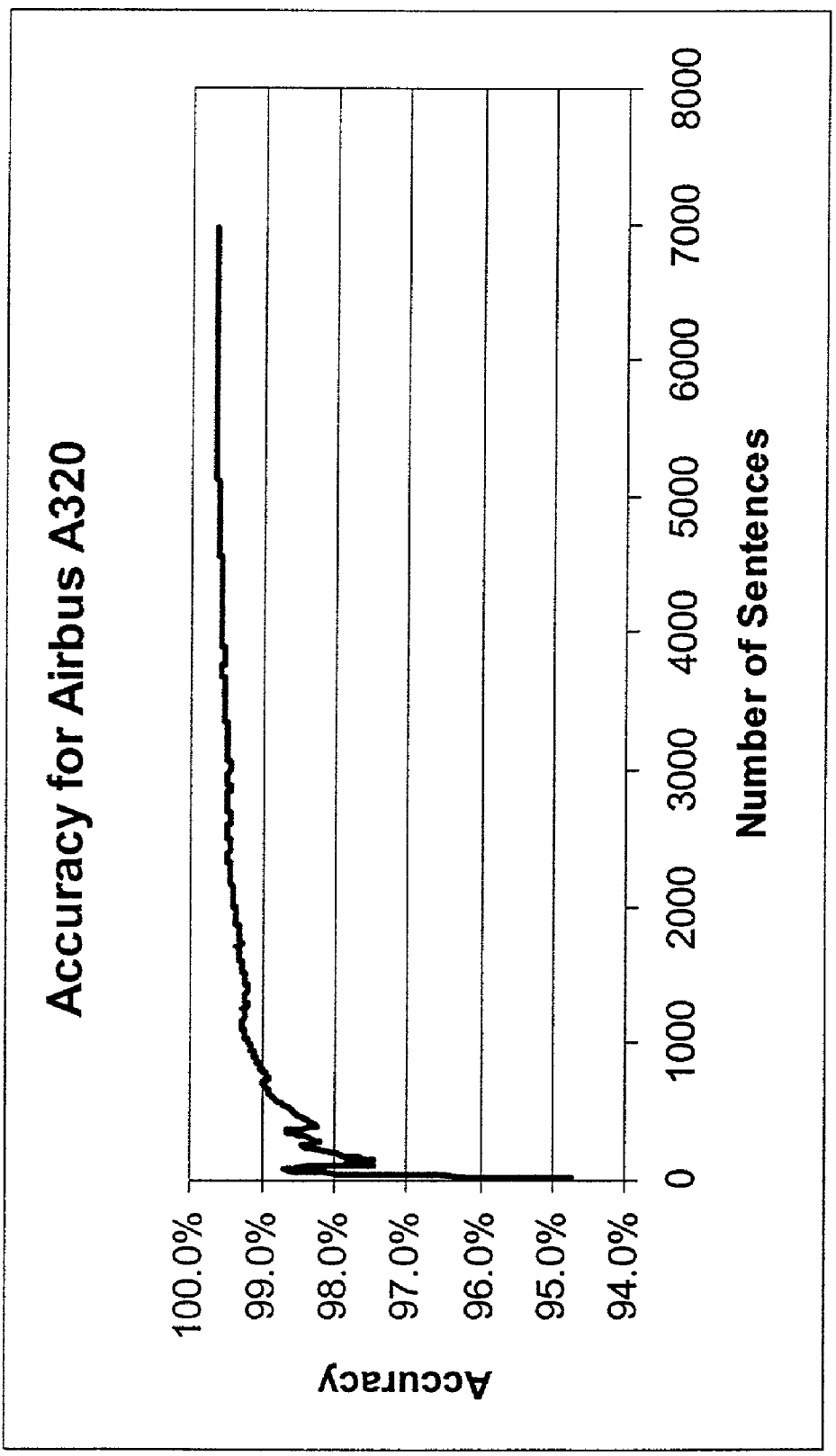
FIG. 12 is a graph showing the accuracy of sentence categorization versus the number of sentences used for training for an Airbus A320 legacy maintenance manual.

FIG. 12 is a graph showing the accuracy of sentence categorization versus the number of sentences used for training for an Airbus A320 legacy maintenance manual. In this experiment, a complete set of 67,000 sentences were obtained from an Airbus A320 maintenance manual. For this data set, the present invention achieved over 99% accuracy after training the sentence with 820 sentences (with 20 sentences per interaction with the user), or approximately one hour of training time. Using current manual methods, only an 80% accuracy level was achieved with 400 hours of conversion time.

Having thus described the preferred embodiments of the present invention, those of skill in the art will readily appreciate that the teachings found herein may be applied to yet other embodiments within the scope of the claims hereto attached.

What is claimed is:

1. A method for categorizing a sentence into one of two or more sentence categories, wherein each sentence category has at least one associated categorized sentence, and wherein the sentence and each categorized sentence has a number of words and/or phrases, the method comprising:
   calculating one or more similarity factor between the sentence and at least one categorized sentence in each of the two or more sentence categories based on selections of words in the sentence and the least one categorized sentence in each of the two or more sentence categories; generating a distance metric for each of the sentence categories using one or more of the similarity factors, the distance metric representing a measure of the similarity between the sentence and the least one categorized sentence in each of the two or more sentence categories;
   categorizing the sentence into one of the sentence categories based on the distance metrics; and
   providing a result that at least in part reflects the categorization of the sentence to a user and/or computer.

2. A method according to claim 1, further comprising the step of processing the sentence and the at least one categorized sentence with a natural language algorithm to identify and assign the words in each sentence to one or more natural language categories.

3. A method according to claim 1, wherein one or more similarity factors provide a measure of similarity according to natural language information.

4. A method according to claim 1, wherein one or more similarity factors provide a measure of similarity according to statistical methods.

5. A method according to claim 1, wherein one or more similarity factors provide a measure of similarity according to domain-specific information.

6. A method according to claim 1, wherein one or more similarity factors provide a measure of similarity according to other relevant information.

7. A method according to claim 1, wherein one or more similarity factors provide a measure of similarity according to a combination of any of natural language, statistical, or other technique.

8. A method according to claim 1, where the one or more similarity factors are combined to generate an overall estimate of the similarity of the sentences.

9. A method according to claim 1, wherein the one or more similarity factors result from one or more of a string overlap function, a keyword match function, a phrase match function, or a model match function.

10. A method according to claim 9, wherein the string overlap function returns how many words in the sentence match a word in the at least one categorized sentence, as a percentage of the number of words in the longest of the sentence and the at least one categorized sentence.

11. A method according to claim 9, wherein the keyword match function returns how many words in the sentence match a word in the at least one categorized sentence with both words having a common word type, as a percentage of the maximum number of keywords in the sentence and the at least one categorized sentence.

12. A method according to claim 11, wherein the common word type is a natural language category, including a noun, a verb, an adverb, a preposition, an object, a direct object, and a subject.

13. A method according to claim 9, wherein the phrase match function returns a sentence similarity value, wherein the sentence similarity value is related to the similarity of one or more selected phrases that exist in both the sentence and the at least one categorized sentences, with both phrases having a common phrase type.

14. A method according to claim 13, wherein the phrase type is one of a noun phrase, a verb phrase, and a prepositional phrase.

15. A method according to claim 9, wherein the model match function includes at least one set of model words, each model word having a corresponding correlation factor that correlates the model word to a category or domain.

16. A method according to claim 15, wherein the model match function returns a sentence similarity value, wherein the sentence similarity value is increased by the correlation factor of a model word when both the sentence and the at least one categorized sentence include the model word, and is decreased by the correlation factor of a model word when only one of the sentence and the at least one categorized sentences include the model word.

17. A method according to claim 1, further comprising the step of identifying words related to those in the sentences, and using the related words to complete the similarity factor.

18. A method according to claim 11, wherein the related words are identified using a domain thesaurus.

19. A method according to claim 17, wherein the related words are identified by removing a suffix or a prefix from selected words in the sentence and the at least one categorized sentences.

20. A method according to claim 1, further comprising the step of extracting one or more named entities from the sentence and the at least one categorized sentences to allow complex groups of nouns to be treated as a single object.

21. A method according to claim 1, further comprising the step of excluding from the comparing step selected words that are identified in a predefined stop list.

22. A method for determining a distance metric that indicates the similarity of a first sentence and a second sentence, wherein the first sentence and the second sentence are extracted from one or more documents, the method comprising the steps of:
  comparing the first sentence and the second sentence using a first comparing function, the first comparing function including a string overlap function and providing a first similarity indicator, the string overlap function returning how many words in the first sentence match a word in the second sentence, as a percentage of the number of words of the longest of the first sentence and second sentence;
  comparing the first sentence and the second sentence using a second comparing function, the second comparing function providing a second similarity indicator;
  calculating the distance metric by combining the first similarity indicator and the second similarity indicator; and
  providing a result that at least in part reflects the distance metric to a user and/or computer.

23. A method according to claim 22, wherein a word in the first sentence is determined to match a word in the second sentence if the word in the first sentence and the word in the second sentence each exceed a minimum number of characters, and the word in the first sentence shares a predetermined minimum number of characters with the word in the second sentence.

24. A method according to claim 23, wherein a word in the first sentence is determined to match a word in the second sentence if the word in the first sentence and the word in the second sentence each have a minimum of four characters, and the word in the first sentence shares at least 80 percent of the characters with the word in the second sentence.

25. A method for determining a distance metric that indicates the similarity of a first sentence and a second sentence, wherein the first sentence and the second sentence are extracted from one or more documents, the method comprising the steps of:
  comparing the first sentence and the second sentence using a first comparing function, the first comparing function including a keyword match function and providing a first similarity indicator, wherein the keyword match function returns how many words in the first sentence match a word in the second sentence with both words having a common word type, as a percentage of the maximum number of keywords in the first sentence and second sentence;
  comparing the first sentence and the second sentence using a second comparing function, the second comparing function providing a second similarity indicator;
  calculating the distance metric by combining the first similarity indicator and the second similarity indicator; and
  providing a result that at least in part reflects the distance metric to a user and/or computer.

26. A method according to claim 25, wherein a word in the first sentence matches a word in the second sentence if the word in the first sentence and the word in the second sentence each exceed a minimum number of characters, and the word in the first sentence shares a predetermined minimum number of characters with the word in the second sentence.

27. A method according to claim 26, wherein the word type of each word is assigned by a part-of-speech tagger function.

28. A method according to claim 25, wherein the keyword match function only attempts to match those words that have a selected word type.

29. A method for determining a distance metric that indicates the similarity of a first sentence and a second sentence, wherein the first sentence and the second sentence are extracted from one or more documents, the method comprising the steps of:
  comparing the first sentence and the second sentence using a first comparing function, the first comparing function including a phrase match function and providing a first similarity indicator, wherein the phrase match function determines a phrase similarity value for each phrase pair by identifying how many words in a first phrase match a word in a second phrase, as a percentage of the maximum number of words in the first phrase and second phrase;
  comparing the first sentence and the second sentence using a second comparing function, the second comparing function providing a second similarity indicator;
  calculating the distance metric by combining the first similarity indicator and the second similarity indicator; and
  providing a result that at least in part reflects the distance metric to a user and/or computer.

30. A method according to claim 29, wherein a weighting factor is applied to each phrase similarity value, depending on the phrase type, to compute the phrase match similarity factor.

31. A method according to claim 29, wherein a word in the first phrase matches a word in the second phrase when the word in the first phrase and the word in the second phrase each exceed a minimum number of characters and share a predetermined minimum number of characters.

32. A method for categorizing sentences in a document, comprising:
   processing a number of selected sentences, said processing step assigning each of the number of selected sentences to one or more predefined categories without using a user entered query, the particulars of the assignment of the number of selected sentences being dependent on a number of operating parameters;
   displaying a correspondence between the one or more predefined categories and the selected sentences;
   allowing a user to change the assigned category for selected sentences;
   updating one or more of the operating parameters to reflect the change in the assigned categories; and repeating the processing, displaying, allowing and updating steps until a desired accuracy level is achieved.

33. A method according to claim 32, further comprising the step of processing all sentences in the document once the repeating step is completed.

34. A method for providing a measure of similarity between a first sentence and a second sentence, each sentence having a number of words, the method comprising:
   comparing one or more words of the first sentence with one or more words of the second sentence, the comparing step returning how many words in the first sentence match a word in the second sentence, as a percentage of the number of words in the longest of the first sentence and second sentence;
   providing a result that is related the comparing step to a user and/or computer.

35. A method according to claim 34, wherein a word in the first sentence is determined to match a word in the second sentence if the word in the first sentence and the word in the second sentence each exceed a minimum number of characters, and the word in the first sentence shares a predetermined minimum number of characters with the word in the second sentence.

36. A method for providing a measure of similarity between a first phrase and a second phrase, each phrase having a number of words, the method comprising:
   comparing one or more words of the first phrase with one or more words of the second phrase, the comparing step returning how many words in the first phrase match a word in the second phrase, as a percentage of the number of words in the longest of the first phrase and second phrase; and
   providing a result that is related the comparing step to a user and/or computer.

37. A method according to claim 36, wherein a word in the first phrase matches a word in the second phrase when the word in the first phrase and the word in the second phrase each exceed a minimum number of characters and share a predetermined minimum number of characters.

38. A method of comparing a first sentence and a second sentence, the method comprising the steps of:
   comparing a word in the first sentence with a word in the second sentence; and
   determining that the word in the first sentence matches the word in the second sentence if the word in the first sentence and the word in the second sentence each have a minimum of four characters, and the word in the first sentence shares at least 80 percent of the characters with the word in the second sentence; and
   providing a result to a user and/or computer.

* * * * *